United States Patent
Gennermann

(10) Patent No.: US 10,163,286 B2
(45) Date of Patent: Dec. 25, 2018

(54) METHOD FOR REMOTELY CONTROLLING AT LEAST A FIRST FUNCTION OF A SAFETY DEVICE OF A VEHICLE

(71) Applicant: Huf Hülsbeck & Fürst GmbH & Co. KG, Velbert (DE)

(72) Inventor: Sven Gennermann, Velbert (DE)

(73) Assignee: HUF HULSBECK & FURST GMBH & CO. KG (DE)

( * ) Notice: Subject to any disclaimer, the term of this patent is extended or adjusted under 35 U.S.C. 154(b) by 0 days.

(21) Appl. No.: 15/508,849

(22) PCT Filed: Sep. 3, 2015

(86) PCT No.: PCT/EP2015/070154
§ 371 (c)(1),
(2) Date: Mar. 3, 2017

(87) PCT Pub. No.: WO2016/034674
PCT Pub. Date: Mar. 10, 2016

(65) Prior Publication Data
US 2017/0249792 A1    Aug. 31, 2017

(30) Foreign Application Priority Data
Sep. 5, 2014   (DE) .......... 10 2014 112 849

(51) Int. Cl.
*G07C 9/00* (2006.01)
*B60R 25/24* (2013.01)
(Continued)

(52) U.S. Cl.
CPC .......... *G07C 9/00142* (2013.01); *B60R 25/01* (2013.01); *B60R 25/209* (2013.01);
(Continued)

(58) Field of Classification Search
CPC . G07C 9/00142; B60R 25/241; B60R 25/209; B60R 25/01; B60R 2325/105;
(Continued)

(56) References Cited

U.S. PATENT DOCUMENTS

| 2013/0090744 A1* | 4/2013 | Tran ................. G05B 11/01 700/9 |
| 2015/0353051 A1* | 12/2015 | Muller ................ G08C 17/02 701/2 |
| 2016/0185253 A1* | 6/2016 | Heidrich ............ B60L 11/1885 701/2 |

FOREIGN PATENT DOCUMENTS

| CN | 1375798 | 10/2002 |
| CN | 103218859 | 7/2013 |

(Continued)

OTHER PUBLICATIONS

International Search Report for International application No. PCT/EP2015/070154 filed Mar. 9, 2015. ISR dated Sep. 2, 2016. 2 pages.
(Continued)

*Primary Examiner* — Nader Bolourchi
(74) *Attorney, Agent, or Firm* — Fish IP Law, LLP

(57) ABSTRACT

Systems and methods for remotely controlling at least a first function of a security device of a vehicle, wherein a remote control device has a first radio unit, whereby a connection to a mobile radio network can be established. The system can be programmed to carry out the following steps:
 a) determining the position of the vehicle
 b) determining the position of the remote control device
 c) determining an actual distance between the position of the vehicle and the remote control device
 d) comparing the actual distance with at least one defined specified distance, wherein the first function is activated if the actual distance is less than or equal to the specified distance.

16 Claims, 8 Drawing Sheets

Figure 2A:
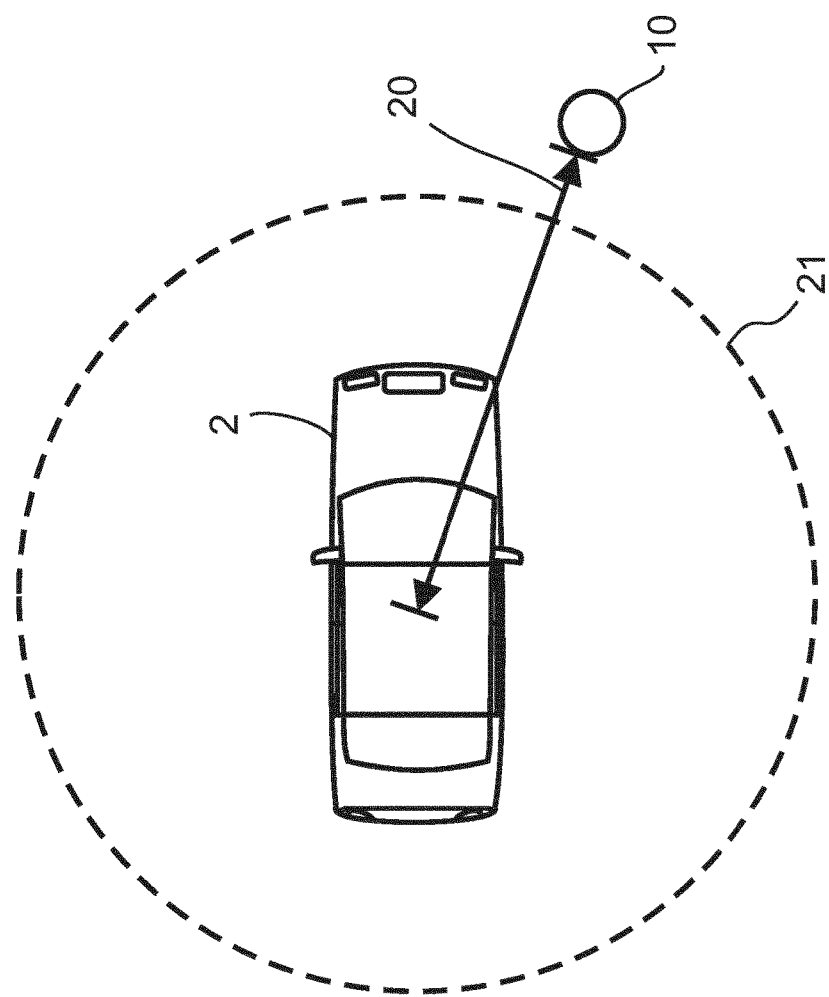

(51) Int. Cl.
    *B60R 25/01*      (2013.01)
    *B60R 25/20*      (2013.01)
    *G08B 21/02*      (2006.01)

(52) U.S. Cl.
    CPC ............ *B60R 25/24* (2013.01); *B60R 25/241* (2013.01); *G08B 21/0272* (2013.01); *B60R 2325/101* (2013.01); *B60R 2325/103* (2013.01); *B60R 2325/105* (2013.01); *B60R 2325/106* (2013.01); *B60R 2325/205* (2013.01)

(58) Field of Classification Search
    CPC ........ B60R 2325/205; B60R 2325/101; B60R 2325/103; B60R 2325/106; G08B 21/0272
    See application file for complete search history.

(56) References Cited

FOREIGN PATENT DOCUMENTS

| | | |
|---|---|---|
| CN | 103661245 | 3/2014 |
| DE | 102012024140 | 6/2014 |
| DE | 102012112808 | 6/2014 |
| EP | 0965491 | 12/1999 |

OTHER PUBLICATIONS

CN 201580047729.7 Office Action dated Aug. 3, 2018 for Method for Remotely Controlling At Least a First Function of a Security Device of a Vehicle (Applicant: Huf Hülsbeck & Fürst GmbH & Co. KG), 17 pages.

* cited by examiner

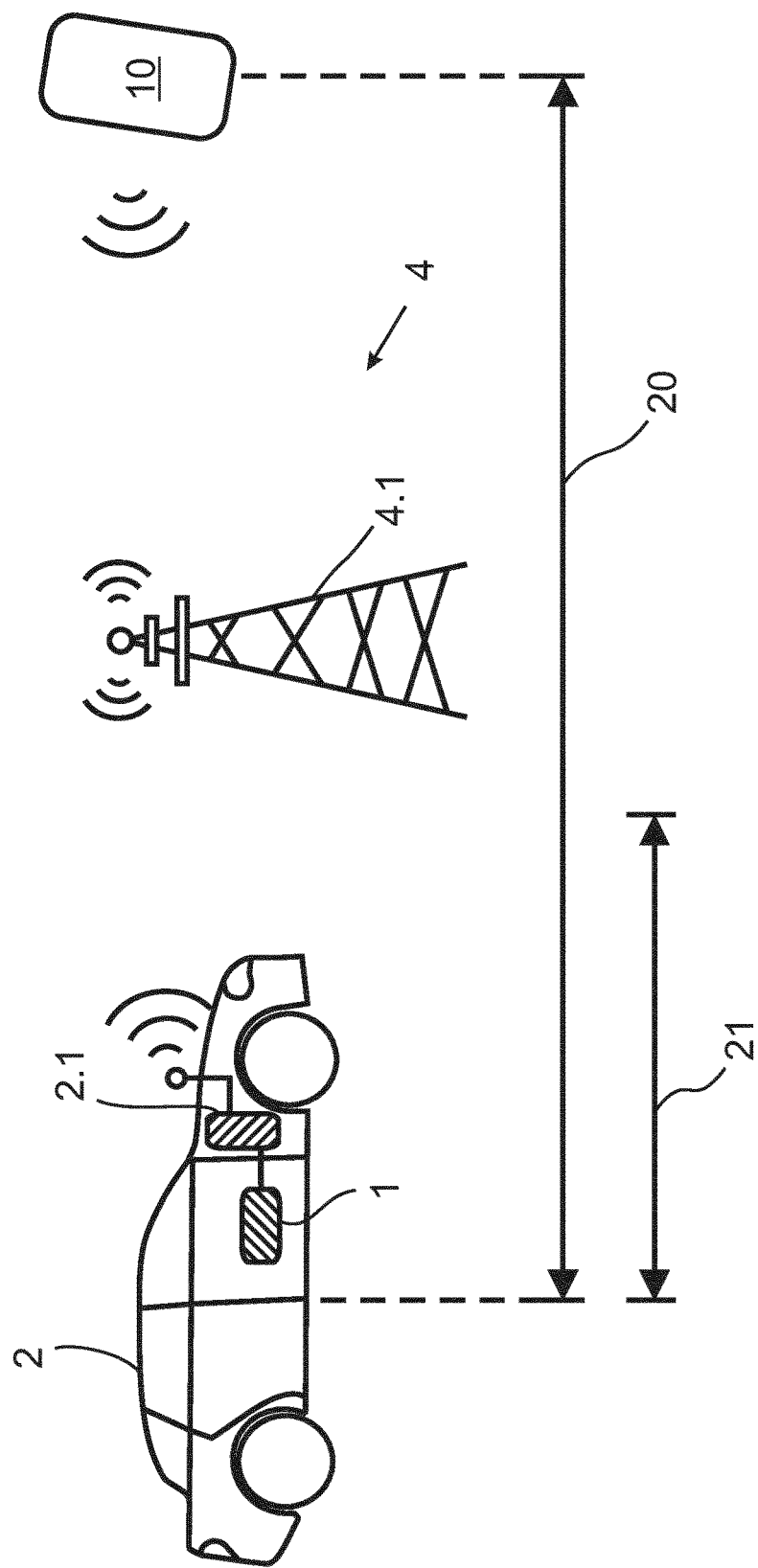

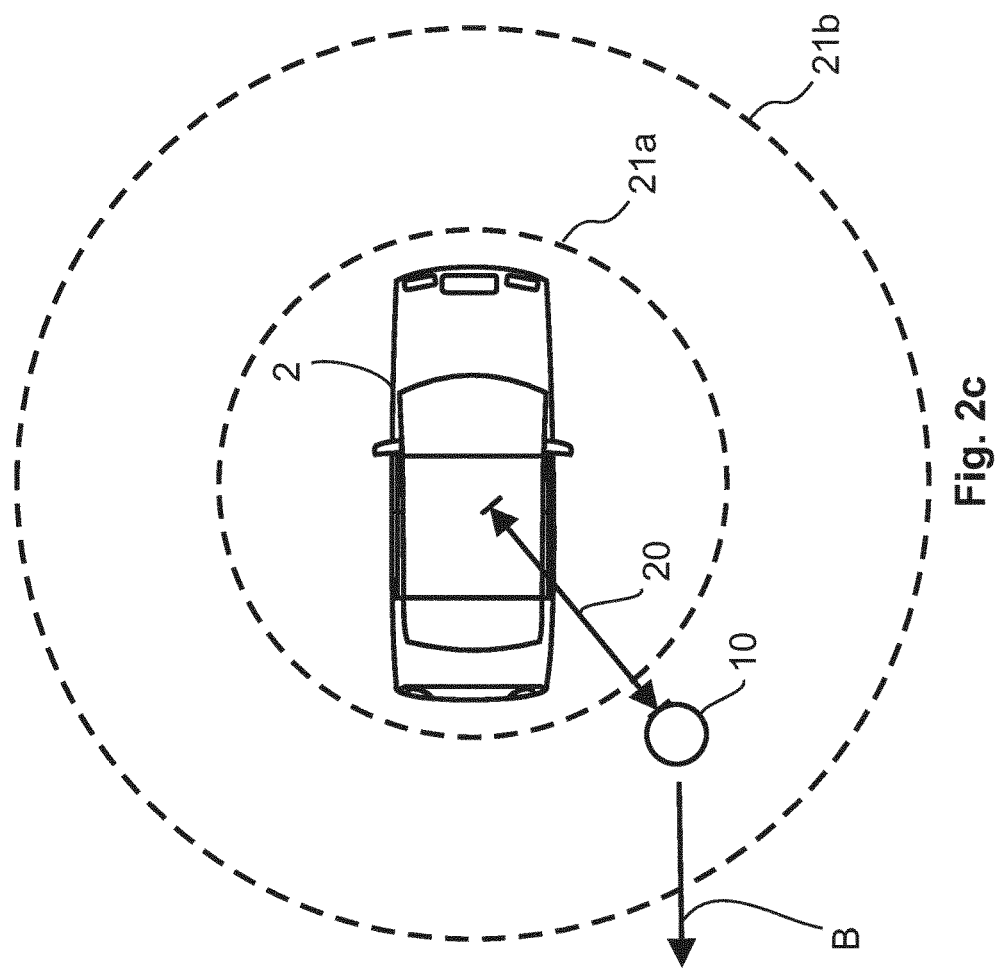

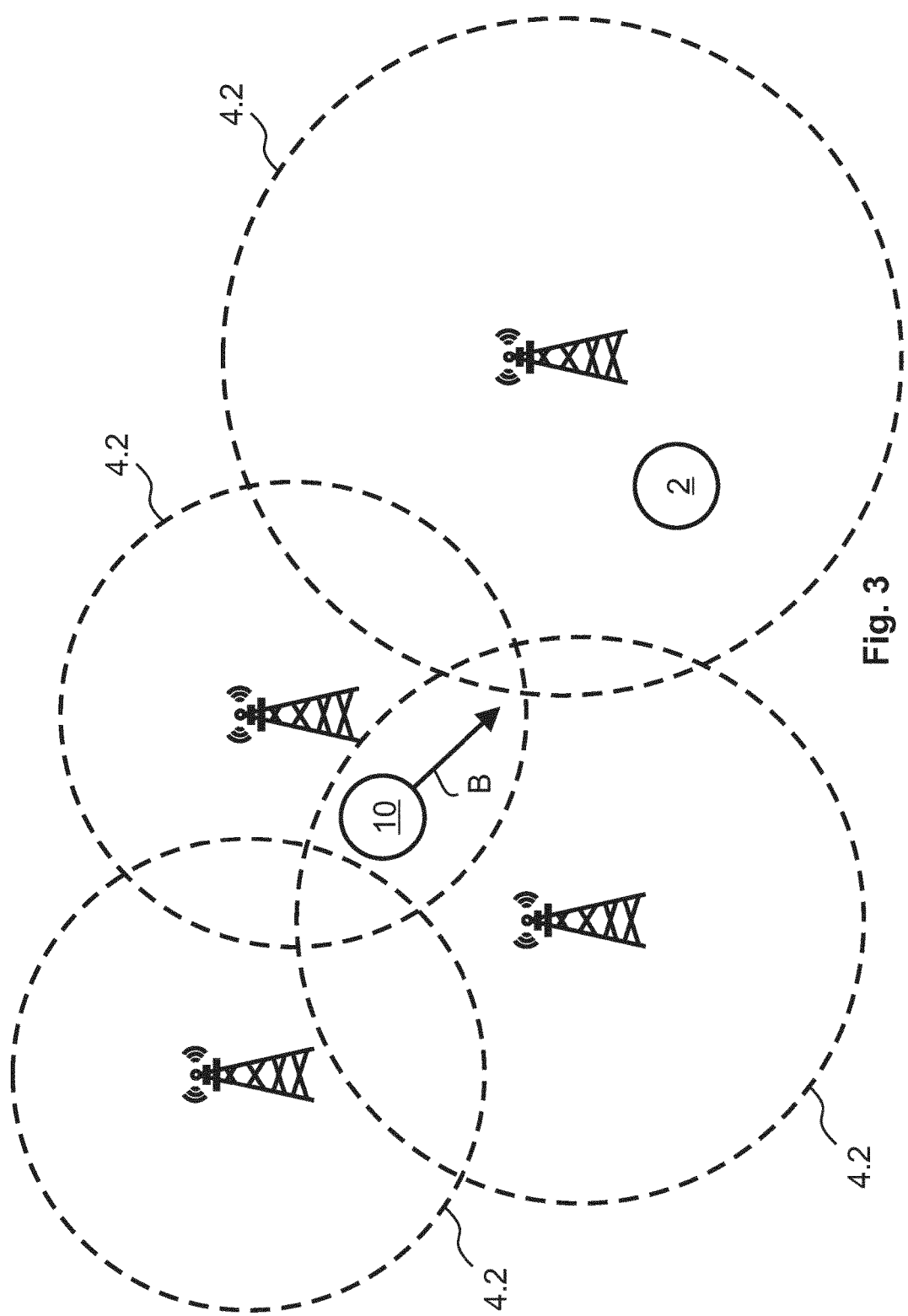

METHOD FOR REMOTELY CONTROLLING AT LEAST A FIRST FUNCTION OF A SAFETY DEVICE OF A VEHICLE

It is known from the prior art that mobile identification transponders (ID transponders) are used by operators of a motor vehicle for contactless authentication with a security device of the vehicle. Preferably, bidirectional communication occurs between the ID transponder and the vehicle here, wherein a security code is transmitted from the ID transponder to the vehicle and is checked. If the security code matches a predefined code, then a locking mechanism of the vehicle is unlocked, for example. To initiate an authentication, the operator must normally trigger the transmission of the security code to the ID transponder actively (e.g. by pushing a button). This is referred to as an active keyless entry system. In a security device having a passive keyless entry function, by contrast, it is not necessary for the operator to take any action with the ID transponder in order to trigger a function of the vehicle. In this case, the security device recognizes the approach of an ID transponder and automatically initiates a data exchange for authentication. As is known, data transmission for this kind of keyless entry systems function by means of a radio link, in particular in the LF (low frequency) range, directly between the ID transponder and the vehicle.

A disadvantage of this arrangement is that authentication can be carried out only using ID transponders or devices of this type that can receive and/or transmit signals via the radio link of the vehicle security device, i.e. particularly LF signals. An operator often carries mobile portable communication devices, such as mobile radio devices (e.g. "smartphones" or "mobile telephones") or notebooks, anyway, which in principle would be suitable to generate security codes for authentication. However, these devices often lack the appropriate means of communication, such as an LF transmitter and receiver. For this reason, an operator must carry a suitable ID transponder along with the mobile portable communication device in order to complete an authentication process with the security device of a vehicle. The ID transponder further requires additional space, contains costly and complicated electronics for corresponding communication interfaces and, if lost, compromises security with the possibility of unauthorized use. Furthermore, a regular cyclical query must be performed by the security device of the vehicle to detect the ID transponder, e.g. by transmitting a wake-up signal. Correspondingly a high energy use by the vehicle electronics system is required for this purpose, which can result in the draining of the vehicle battery.

It is therefore an object of the present invention to redress, at least in part, the disadvantages described above. In particular, object of the present invention is to enable a cost-effective, secure and reliable use of mobile portable communication devices, particularly mobile radio devices, to remotely control at least a first function of a security device of a vehicle. In this way, it is possible to avoid in particular a separate ID transponder, thereby saving money and energy, and to increase security and expand the functionality of the keyless entry system.

The aforementioned object is solved according to the systems and methods described herein. In embodiments, the inventive subject matter can comprise a computer-readable storage medium storing computer program instructions that, when executed by a processor, carry out the various steps of the inventive subject matter. The features and details described in connection with the method according to the invention naturally also apply in connection with the remote control device according to the invention, the system according to the invention, the vehicle, the computer program product according to the invention and the computer-readable storage medium according to the invention, and vice versa, and so, with regard to the disclosure, reciprocal reference always is or can be made to the individual aspects of the invention.

The method according to the invention allows in particular for the contactless remote control of at least one first function of a security device of a vehicle, and in particular a motor vehicle. The security device can have, for instance, keyless entry, passive or active keyless entry and/or a keyless go functionality. A remote control device is provided, which can be configured e.g. as a GPS receiver, mobile portable communication device, mobile radio device, smartphone, mobile telephone, tablet computer and/or portable computer (notebook) or the like. The remote control device in this instance has a first radio unit, by which a link with the mobile radio network can be established. According to the invention, the following steps are carried out:

a) Determining the position of the vehicle, in particular the geographic position, which is determined e.g. directly by using a GPS system (Global Positioning System) or indirectly by mobile radio tracking, in particular by cell tracking.
b) Determining the position of the remote control device, in particular directly by using a GPS system or indirectly by mobile radio tracking.
c) Determining an actual distance between the position of the vehicle and the remote control device.
d) Comparing the actual distance with at least one defined specified distance, wherein the first function is activated if the actual distance is less than or equal to the specified distance.

In the context of the specified distance, the term "defined" means that the specified distance can be saved e.g. on a memory device and/or computer-readable storage medium, such as one in the vehicle. Moreover, steps a) and b) in particular can be performed in any order, i.e. the position of the remote control device can be determined first in accordance with step b) and then the position of the vehicle in accordance with step a). Step c) particularly requires that the positions of the vehicle and the remote control device already be available for a determination of the actual distance. Step d) particularly requires that the actual distance be determined beforehand. In this way, the remote control device can very reliably be tracked by the vehicle, and e.g. the remote control device can thereby perform an ID transponder function in addition to its original function (for example that of a mobile radio device for mobile radio communication). Positioning by means of a GPS system and mobile radio tracking can also be combined to improve precision. Mobile radio tracking can also include network determination, for example, wherein the available radio cells, the distance of the radio antennas, the type and/or provider of the receivable radio cells or radio networks and/or the like can be drawn upon for positioning.

The actual distance is preferably determined by an evaluation system in the vehicle (e.g. a vehicle electronics system), an evaluating unit of the remote control device and/or an exchange service, such as an internet server. The actual distance can be calculated, for example, by comparing the determined positions of the vehicle and/or the remote control device with pre-defined or previously saved coordinates and/or geographic maps. Internet-based cartographic or geographic information services, positioning services and/or map or geographic information databases can also be employed in the process. It is likewise conceivable that the position of the vehicle, the position of the remote control device and/or the actual distance are determined completely and/or at least in part by the vehicle navigation system. Furthermore, the actual distance can also be determined, for example, by directly or indirectly evaluating the signal strength of a link between the vehicle and the remote control device (particularly only when the remote control device is close to the vehicle). The advantage thereby achieved is that it is possible to detect the approach of an operator of the remote control device. A first function of the vehicle is activated only within a predefined distance (the specified distance). Thus an authentication can take place with the vehicle security device without the operator needing a separate ID transponder. It is possible, for instance, to unlock the locking mechanism of the vehicle by means of and based on the authorization with the security device. Additionally, further functions of the vehicle can be activated when an approach is detected, i.e. if the actual distance is less than or equal to the specified distance. These can include activating the headlights when the operator has approached to a few meters away with the remote control device. Comfort and safety during the use of the vehicle can be improved in this way.

It is particularly advantageous when the following step is carried out as the first function:

e) Contactless authentication of the remote control device, in particular via the mobile radio network and/or a Bluetooth connection with the security device of the vehicle.

The term "contactless" refers to the fact that neither a wired electrical connection for authentication nor a mechanical authentication (e.g. using a mechanical key) is required for the security device. Additionally, the contactless authentication can be carried out e.g. over a Bluetooth-standard and/or NFC-standard link. An expansion of the Bluetooth standard, such as Bluetooth low power or Bluetooth low energy, can also be used. A protocol stack can be used here, which is well-suited to permit communication among Bluetooth devices within a maximum range of e.g. 10 meters with significantly reduced energy usage. Owing to the smaller range, security can also be increased, since an authentication is possible only in the immediate vicinity of the vehicle. An unnoticed, inadvertent unlocking of the security device is thereby prevented. Thus the use of an NFC (near field communication) connection, which has a maximum range of only a few centimeters (e.g. less than 5 cm, 10 cm and/or 15 cm), is also advantageous. It can likewise be possible that an LF (low frequency) and/or HF (high frequency) and/or WLAN (wireless local area network) connection is used for authentication. The authentication is carried out in particular via a bidirectional radio and/or data link, in particular directly and/or indirectly between the vehicle and the remote control device. A direct connection here is particularly a connection established exclusively between two devices, such as the vehicle and the remote control device. An indirect connection exists, for instance, when the mobile radio device, such as a GSM (Global System for Mobile Communication) network, a UMTS (Universal Mobile Telecommunication System) network, a GPRS (General Packet Radio Service) and/or an LTE (Long-Term Evolution) mobile radio network, is used, since more relay stations have to be utilized. It is likewise possible that the connection technologies described above can be combined for contactless authentication in order to increase failure safety. Since contactless authentication is carried out as the first function if the actual distance is less than or equal to the specified distance, the operator can very comfortably control the security device remotely without needing to actuate the remote control device actively.

As a further advantage, it can be possible that a security code is exchanged between the remote control device and the security device of the vehicle in step e), wherein in particular the security code can include an IMEI code of the remote control device, a generated code and/or a defined code, particularly for uniquely identifying the remote control device. The IMEI (International Mobile Station Equipment Identity) in this case is a unique 15-digit serial number of a mobile radio device (such as a mobile telephone or smartphone), which can be used to uniquely identify the mobile radio device. Since the IMEI of a mobile radio device can be read out and/or modified, it can also be reasonable to employ e.g. further security codes in addition to and/or in combination with the IMEI code for authentication in the vehicle security device. This can be a generated security code that is produced, for example, by software or an app in the remote control device or by an evaluating unit of the remote control device. It can also be possible that the security code or a list of security codes are saved in a memory unit of the remote control device such that they can be read out and in particular encrypted by the evaluating unit and, in this way, pre-defined. Said codes can then be read out and/or encrypted by the evaluating unit according to a predetermined formula and then transmitted by the remote control device to the vehicle or the security device of the vehicle for authentication. A non-volatile memory unit of the remote control device, which also includes a computer program product according to the invention in addition to the security codes, is preferably used for this purpose. The computer program product can also generate the security codes, for example. Thus the remote control device allows for a secure and reliable authentication without a separate ID transponder being required.

Advantageously, it can be possible within the scope of the invention that access to the vehicle is granted by the security device following a successful authentication. A locking mechanism of the vehicle is unlocked, for instance, by the activation of the first function following successful authentication. It is possible as a result that an operator who is approaching the vehicle with the remote control device can open the doors of the heretofore locked vehicle and enter and possibly also start the engine (e.g. by means of an start/stop button in the vehicle interior) without actively actuating the remote control device (i.e. without actuating an input mechanism of the remote control device, such as a touch display) and without activating a separate ID transponder. The authentication required for this task occurs contactlessly in the background, in particular without requiring the active involvement of the operator. This type of authentication thus reliably prevents an unauthorized user from gaining access to the vehicle while significantly increasing comfort.

As a further advantage, it is conceivable that step a) and/or b) and/or c) and/or d) are carried out by the vehicle, in particular by a vehicle electronics system, wherein in particular in order to determine the actual distance the position of the remote control device is received by a communication device in the vehicle. To detect an approach of the operator with the remote control device, i.e. to determine the actual distance, it is necessary to ascertain the position of the remote control device and the vehicle. It is possible in this case that the actual distance is determined (e.g. exclusively) by the vehicle, by the remote control device, in particular an evaluating unit of the remote control device, and/or by a further device, such as an exchange service based on the position of the remote control device and the position of the vehicle. In order for the vehicle to determine the actual distance, it must ascertain the position of the remote control device and the position of the vehicle. The latter it can directly determine itself, e.g. using the navigation system and/or a GPS device. On the other hand, a connection must be established between the vehicle and the remote control device in order for the position of the remote control device to be determined. When the remote control device is in close proximity to the vehicle, it can be possible that the actual distance and/or the position of the remote control device are determined e.g. by a direct connection, such as an evaluation of the signal strength of a radio, WLAN, Bluetooth and/or NFC connection. However, the distance of the remote control device from the vehicle could also be in the range of several kilometers. Since certain connections, like direct radio, WLAN, Bluetooth and/or NFC connections, are not possible under these circumstances, a mobile radio connection and/or a network or internet link, for example, is used to transmit the position data of the remote control device to the vehicle. To receive these data and establish the connection, the vehicle must therefore have a communication device that is suitable for operating this connection. Said communication device can be e.g. a radio unit for operating a connection with a mobile radio network, such as a GSM device and/or a device for creating a network and/or internet connection. The term internet can refer to a public, world-wide network of networks and/or terminals or also to a private and/or partially public network. What is essential is that a data communication takes place over long distances and, if necessary, via multiple switching stations. It is possible that the position (i.e. e.g. the position data and/or geographic coordinates) of the remote control device is transmitted cyclically (i.e. periodically in time) to the communication device of the vehicle, e.g. also indirectly via a switching service. The time intervals of the cyclical transmission can be set by a timer in the remote control device, by a computer program product of the remote control device and/or by transmitted parameters of the switching service or of the vehicle, which the remote control device receives via the connection. The connection, i.e. in particular the data link, can additionally permit the bidirectional transmission of data. The advantage thereby achieved is that the current location of the remote control device is regularly available for a calculation of the actual distance.

It is further possible that a first specified distance and at least one second specified distance are defined, wherein a first function is activated in step d) if the actual distance is less than or equal to the first specified distance, and at least a second function is activated if the actual distance is less than or equal to the second specified distance. In addition to the second specified distance, further specified distances (e.g. a third, fourth and/or fifth specified distance) can also be defined, which are accordingly associated with third, fourth, fifth and/or additional functions of the vehicle. Different actual distances are thus assigned different functions of the vehicle, wherein an approach of the remote control device or the operator with the remote control device triggers the activation of these functions (of the security device) of the vehicle in stages. Since the second specified distance can be greater than the first specified distance, for instance, the second specified distance will thus be reached as the operator approaches, and the second function will be activated before the first function as the operator approaches further. For example, the electrical systems of the vehicle can already be started up as the first stage when the remote control device reaches the second specified distance. Only upon further approach (as the second stage), i.e. when the actual distance is less than or equal to the first specified distance, does the authentication and, if necessary, the release of the locking mechanism occur. Conversely, a further function could be activated and/or a first function deactivated again upon leaving the vicinity of the first specified distance, for example, if the actual distance is greater than the first specified distance. By deactivating the first function, the locking mechanism of the vehicle could be locked again and access to the vehicle prevented by the security device. It is likewise possible that further functions are also activated when the actual distance is greater than the second and/or third and/or fourth and/or fifth further specified distances. For example, the electrical systems of the vehicle can be shut down again when the remote control device moves outside of the second specified distance and the time interval for carrying out steps b) and/or c) and/or e) can be increased (e.g. to reduce energy use) when it moves outside of the third specified distance. At the same time, this distance-dependent activation and/or deactivation of functions (of the security device) of the vehicle in stages can ensure greater comfort and energy efficiency.

A further possibility is that step a) is carried out with very standstill of the vehicle. Since it is usually not necessary to detect the approach of the operator and/or the remote control device while the vehicle is moving, the method according to the invention can be performed, for example, only when the vehicle is at a standstill. Energy efficiency is likewise facilitated in this way. It is possible, as well, that the vehicle can be started only when the actual distance is substantially 0 m, for example, since the operator is inside the vehicle in this instance. Starting the vehicle, as a further activatable function, can thus be associated with a further, established specified distance of substantially 0-0.5 m.

It is also conceivable that step a) and/or b) and/or c) and/or d) and/or e) are carried out time-dependently, particularly cyclically, depending on the actual distance. It can therefore be provided that determining the position of the remote control device in accordance with step b), e.g. by a receipt of the position or position data of the vehicle by a communication device of the vehicle, determining the position of the vehicle in accordance with step a), determining the actual distance e.g. by an evaluation system of the vehicle in accordance with step c) and/or comparing the actual distance with at least one defined specified distance are repeated cyclically at particular intervals. Steps a) and/or b) and/or c) and/or d) and/or e) can be carried out successively, for example. It can be possible that the time intervals are proportional to the actual distance. For instance, a greater distance between the actual and specified distances produces a greater time interval, since it should not be expected that the operator or the remote control device will arrive soon. The time interval for determining the position of the remote control device can also be identified by an evaluation system of the vehicle and can be transmitted to the remote control device via a data link. The frequency with which the position of the remote control device is determined is then adapted to this time interval by the remote control device. This achieves the advantage that energy efficiency can be realized in both the vehicle and the remote control device.

Advantageously, it can be possible in the invention that step a) and/or b) and/or c) and/or d) and/or e) are carried out time-dependently, particularly cyclically, depending on a situation-dependent status parameter. Steps a) and/or b) and/or c) and/or d) and/or e) can be carried out successively, for example. Said condition parameter is identified by the remote control device and/or by the vehicle based on the measured and calculated input data for current situations of the remote control device. For example, these input data can be position data, the actual distance, the time of day and/or the date, calendar entries of the remote control device, the type of movement (e.g. fast or slow movement) and/or the direction of travel (i.e. compass direction) of the remote control device. The input data are correlated e.g. by the evaluating unit of the remote control device, by the evaluation system of the vehicle and/or by an internet-based switching service and the status parameter is hereby identified. This leads to the operator's respective situation being intelligently identified based on the status of the remote control device, and from this it is possible to make a (numerically determinable) prediction about when the condition will be fulfilled in which the actual distance is less than or equal to the specified distance. If, for instance, the remote control device is located several kilometers away from the vehicle and/or is quickly or slowly moving away from the vehicle, the time interval used for determining the actual distance, for example, can be increased, thereby saving energy. Vehicle functions can likewise be activated and/or deactivated depending on the time of day or calendar entries that the operator has saved in the remote control device. It is also possible that further information transmitted, for example, by an exchange service via the internet and/or via the remote control device is correlated and evaluated to determine the status parameter and/or to activate and/or deactivate functions of the vehicle. This offers the advantage that the vehicle de-icing functions are activated at low outdoor temperatures, for instance, when the approach of an operator (i.e. the remote control device) is detected and/or predicted. Thus it can suffice to activate and/or deactivate vehicle functions if the condition that the actual distance is less than or equal to a specified distance is predicted to be fulfilled (i.e. has not actually been fulfilled). Also possible is that a function, such as the vehicle alarm system, is activated at a particular actual distance or by particular calendar entries or operator specifications that have been saved on the remote control device (e.g. a holiday period, time of day, etc.). A higher level of comfort and safety is achieved in this way.

Moreover, it is possible that the remote control device and/or the vehicle receive their position data contactlessly, wherein in particular the position data come from a navigation system (particularly a GPS system), a mobile radio network by identifying the mobile radio cells and/or a (fixed or stationary) network. The remote control device and/or the vehicle can also have e.g. a position receiver such as a GPS device for connecting to a GPS system. It is likewise possible that the position data are identified in that area networks, such as fixed and/or stationary WLAN and/or Bluetooth networks in the vicinity of the remote control device and/or vehicle, are evaluated. Moreover, it can be possible that a combination of the described possibilities for identifying the position data is utilized in order to increase accuracy.

A further possibility within the scope of the invention is that the mobile radio network is configured according to a GSM, GPRS, UMTS and/or LTE standard and in particular that it has a data link to an internet and/or to an exchange service (e.g. via the internet) and/or to the vehicle. In addition to GPRS (General Packet Radio Service), UMTS (Universal Mobile Telecommunication System) and/or LTE (Long Term Evolution), other technologies can certainly be employed to establish a data and/or internet connection for the mobile radio network. If, for example, the data for authentication and/or determining the positions of the remote control device are transmitted via a network, data and/or internet connection, then this connection can be established directly between the vehicle and the remote control device or indirectly e.g. via the internet with a connection to an exchange service. Said exchange service can be a data exchange service, such as a server, which receives, evaluates and forwards the data. Thus it is possible that the remote control device and/or the vehicle merely transmit their positions to the exchange service, and said service determines the actual distance on the basis of the received position data. Finally, the exchange service can transmit the result, i.e. the actual distance and/or the satisfaction of the condition that the actual distance is less than or equal to the specified distance, to the vehicle and/or the remote control device. Costs and energy can therefore be reduced, since the exchange service establishes a data link with the vehicle via the mobile radio network, for instance, only when e.g. a first function is supposed to be activated and/or deactivated.

Advantageously, it can be possible within the scope of the invention that the remote control device and/or the vehicle has a second radio unit for receiving their position data and/or for authentication, wherein in particular a connection with a GPS, WLAN, mobile radio and/or Bluetooth network can be established by the second radio unit. Thus it can be possible that e.g. only a first radio unit of the vehicle and/or of the remote control device is provided both to connect with the mobile radio network and to receive the position data, or that e.g. a further, second radio unit is provided only to receive the position data. The second radio unit can be well-suited e.g. only to receive data or radio signals, i.e. for a unidirectional link. This is the case, for instance, when the second radio unit is used for positioning by means of a GPS (Global Positioning System). Moreover, it is conceivable that the first radio unit, the second radio unit and/or a third radio unit are used by the vehicle and/or remote control device for authentication with step e), wherein a connection e.g. with a GPS, WLAN, mobile radio and/or Bluetooth and/or Bluetooth low-power network can be operated by the second and/or third radio unit. It can be possible in this way to carry out reliable data transmissions e.g. for authentications in accordance with step e) and/or positioning.

Advantageously, it can be possible within the scope of the invention that the vehicle has a communication device, by means of which a data link can be established with the remote control device. The data link between the vehicle and the remote control device can be established "directly" through the mobile radio connection (via a data exchange service such as GPRS or the like) or Bluetooth or indirectly, e.g. via an internet connection with a server or an exchange service. The difference from the direct connection can be seen in the fact that, in the indirect connection, a direct selection or an authentication (pairing) between the remote control device and the vehicle is not necessary, and only the direct connection must be established between each side and a server, for instance. For example, authentication information can thus be centrally administered in a central location and the connection can be centrally controlled. The communication device serves additionally, and in particular only, to receive the particular position of the remote control device. For this purpose, the communication device can include a mobile radio transponder unit, which establishes a data link via the internet, for example. It is furthermore possible that the vehicle transmits its position to the remote control device via the data link, wherein the remote control device can calculate the actual distance by means of an evaluating unit based on the position of the vehicle and its own position. This offers the advantage both that the vehicle always knows the position of the remote control device and that the remote control device always knows the position of the vehicle.

Advantageously, it can be possible within the scope of the invention that a communication device of the vehicle is provided to establish a data link with the remote control device, wherein particularly an emergency signal is emitted via said communication device in the event of an accident. The vehicle can also have e.g. a crash sensor, by means of which an accident that has occurred and/or is impending can be detected. Acceleration sensors and/or radar systems of the vehicle can also be utilized for this purpose. If an accident or emergency is detected, an emergency signal, possibly with the exact position of the vehicle, can be transmitted to a predefined recipient via the communication device. To this end, the communication device has in particular a connection with the mobile radio network, which simultaneously also serves to transmit the position of the vehicle to the remote control device and/or to receive the position of the remote control device. This can lead to shortened rescue times. It is furthermore possible that the position of the vehicle is transmitted cyclically to an exchange service, e.g. an internet server. The exchange service could thus be used to locate the vehicle in an emergency.

The subject matter of the invention also includes a remote control device, in particular with a mobile radio device (i.e. also configured, for example, as a mobile radio device). The remote control device can additionally also be e.g. an ID transponder, a mobile telephone, smartphone, laptop or the like and serves to remotely control at least a first function of a security device of a vehicle, particularly a motor vehicle, and has a first function, by which a connection with a mobile radio network can be established. The position of the vehicle, the position of the remote control device and an actual distance between the positions of the vehicle and the remote control device can be determined in particular by an evaluating unit. It is provided that the actual distance can be compared with at least one defined specified distance in particular by the evaluating unit, wherein the first function in particular can be actuated by the evaluating unit if the actual distance is less than or equal to the specified distance. The remote control device according to the invention therefore offers the same advantages as those extensively explained with regard to a method according to the invention. In addition, the remote control device according to the invention can be well-suited to perform the method according to the invention.

Furthermore, it is possible that the position of the remote control device is transmittable to the vehicle by the first radio unit. It can also be possible, where appropriate, that the position of the vehicle can be received from the remote control device by the first radio unit. Moreover, an evaluating unit of the remote control device can be provided which receives the position data and comprises e.g. a microprocessor and/or microcontroller and/or an (ARM) processor in order to evaluate the position data, execute a computer program product according to the invention and/or determine the positions. For this purpose, data from an internet-based positioning and/or map service, for example, can be received by the remote control device. Thus the remote control device and/or the vehicle can utilize the positions of the remote control device and/or vehicle to determine the actual distance.

Preferably, a display unit is provided on the remote control device and it is arranged particularly such that it is visible to the operator, wherein the position of the vehicle can be displayed on the display unit so as to locate the vehicle for the operator. The display unit in this case can be a touchscreen, such as an optical, resistive or capacitive touchscreen. The display unit can thus act as an input device of the remote control device at the same time. The vehicle can then be located by means of a computer program product, such as an app, on a remote control device configured e.g. as a smartphone. The position of the vehicle is displayed on a map on the display unit and/or the direction in which an operator of the remote control device must move in order to reach the vehicle is indicated. This results in the advantage that an operator who has forgotten where the vehicle is parked has support in locating it.

The subject matter of the invention additionally includes a system for remotely controlling at least a first function of a security device of a vehicle. A remote control device is provided here, which has a first radio unit by means of which a connection with a mobile radio network can be established. The position of the vehicle, the position of the remote control device and the actual distance between the positions of the vehicle and remote control device can thereby be determined. Furthermore, the actual distance can be compared with a defined specified distance, wherein the first function can be activated with the actual distance is less than or equal to the specified distance. The system according to the invention therefore offers the same advantages as those extensively explained with regard to a method according to the invention and a remote control device according to the invention. The system according to the invention can include a remote control device according to the invention, which is well-suited to carry out the method according to the invention. The system according to the invention can additionally comprise a computer program product according to the invention, a computer-readable storage medium according to the invention and/or a vehicle according to the invention.

The object according to the invention is likewise solved by a computer program product for remotely controlling at least a first function of a security device of a vehicle. The computer program product according to the invention can be designed such that it carries out a remote control method, in particular with a remote control device according to the invention and/or a system according to the invention and/or a vehicle according to the invention, particularly when it is uploaded and executed from a processing unit or processor. The computer program product according to the invention therefore offers the same advantages as those extensively explained with regard to a method according to the invention, a remote control device according to the invention and a system according to the invention.

The subject matter of the invention also includes a computer-readable storage medium. The computer-readable storage medium according to the invention is in particular a non-volatile memory unit of a remote control device according to the invention and/or a non-volatile storage device of a vehicle according to the invention, wherein the computer-readable storage medium according to the invention comprises the computer program product according to the invention. The computer-readable storage medium according to the invention therefore offers the same advantages as those extensively explained with regard to a method according to the invention, a remote control device according to the invention, a system according to the invention and a computer program product according to the invention. Furthermore, it is possible that the computer-readable storage medium is also a non-volatile storage device, such as a hard drive and/or a flash memory and/or an SSD memory or the like in particular of an exchange service, wherein said exchange service can be configured as an internet server, for instance, and can execute the method according to the invention and computer program product according to the invention, for example, to determine and compare the actual and specified distances.

A further subject of the invention is a vehicle, particularly a motor vehicle, that can have an evaluation system or a vehicle electronics system to carry out the method according to the invention. The vehicle according to the invention therefore offers the same advantages as those extensively explained with regard to a method according to the invention, a remote control device according to the invention, a system according to the invention, a computer program product according to the invention and a computer-readable storage medium according to the invention.

Figure 2B:
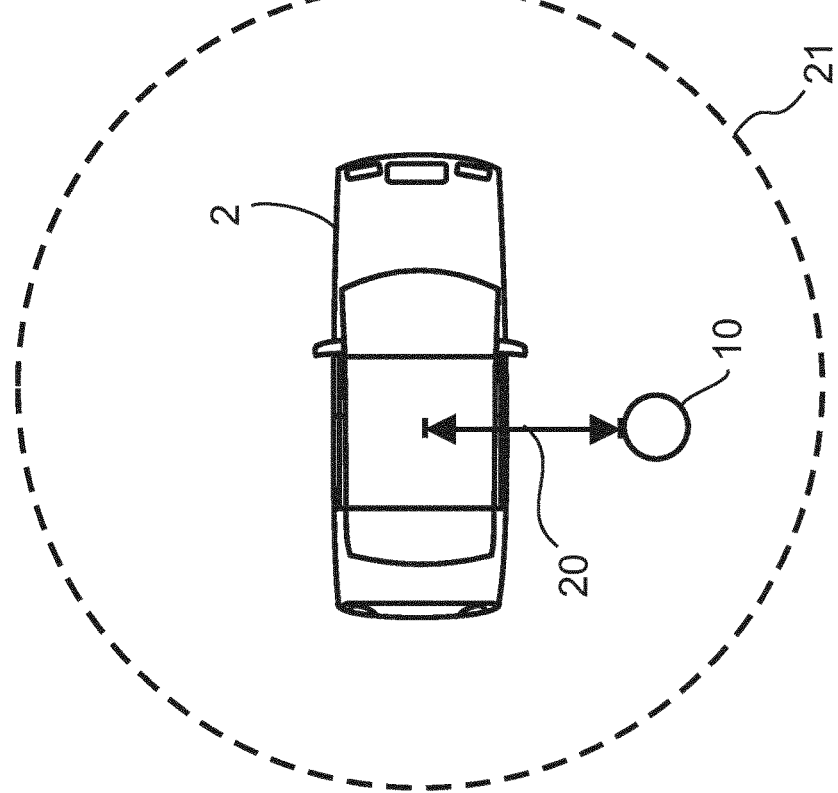
Figure 4:
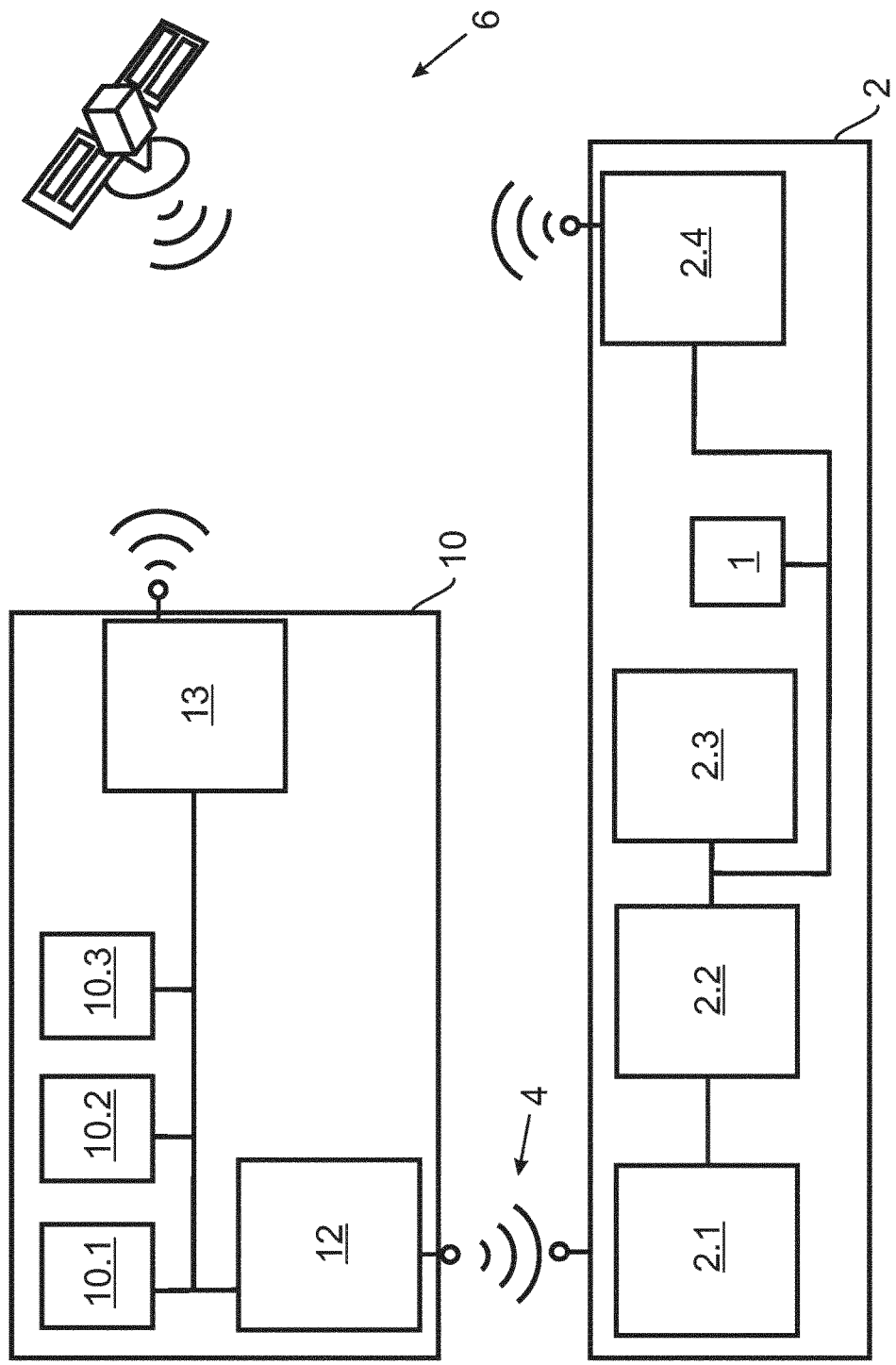
Figure 5:
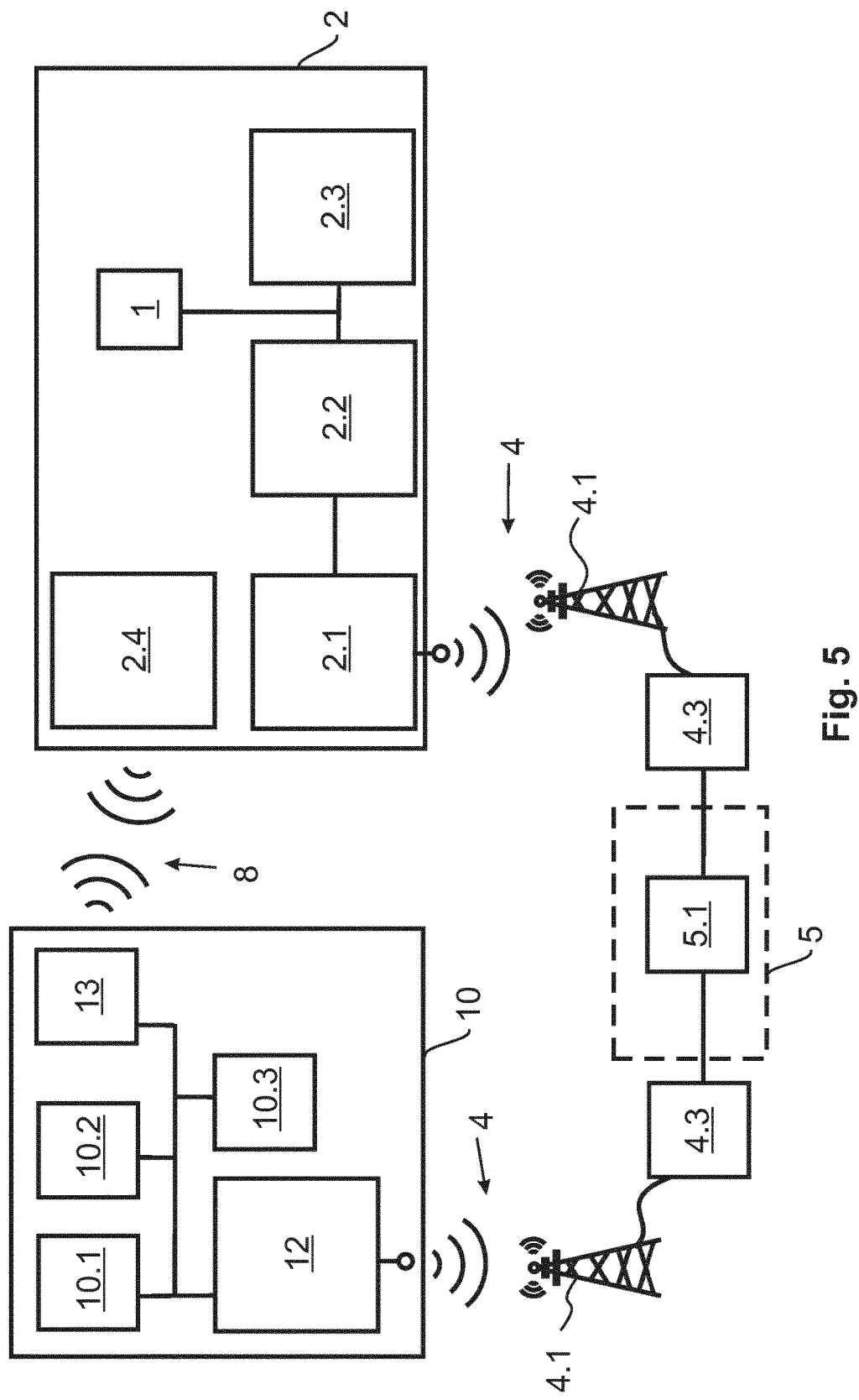
Figure 7:
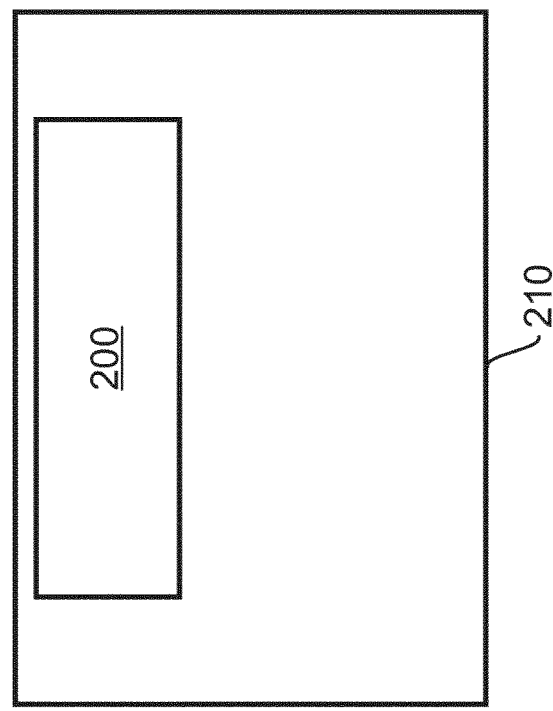
Figure 6:
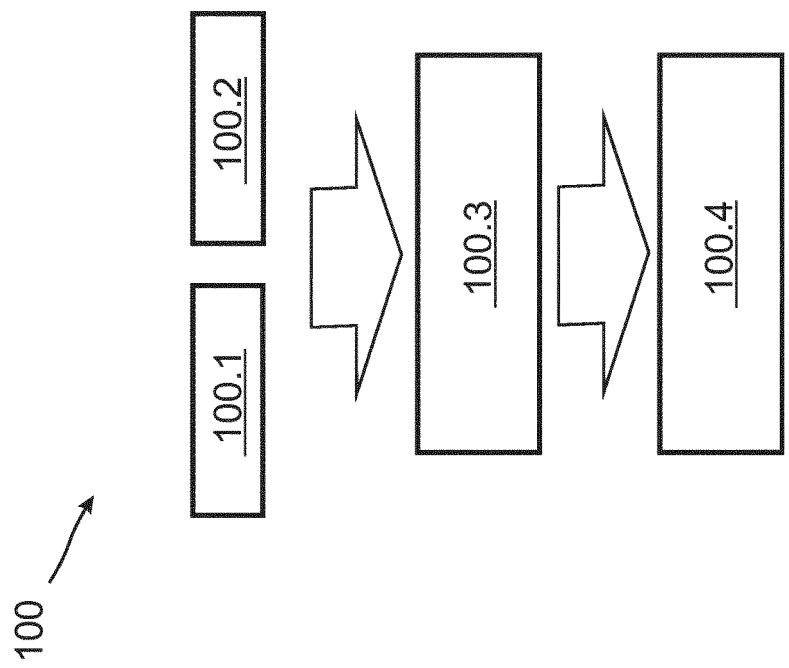

Further advantages, features and details of the invention will emerge from the description below, in which embodiments of the invention are described in detail with reference to the drawings. All of the features mentioned in the claims and description, either individually or in any given combination, can be essential to the invention. The following is shown:

FIG. 1 a schematic representation of a vehicle according to the invention, a remote control device according to the invention and a system according to the invention, FIGS. 2a-c a schematic representation to visualize an actual distance and a specified distance, FIG. 3 a schematic representation to visualize mobile radio tracking, FIG. 4 a schematic representation of an embodiment of a remote control device according to the invention and a vehicle according to the invention, FIG. 5 a schematic representation of a further embodiment of a remote control device according to the invention and a vehicle according to the invention, FIG. 6 a schematic representation to visualize a method according to the invention, and FIG. 7 a schematic representation to visualize a computer program product according to the invention and a computer-readable storage medium according to the invention.

In the figures which follow, identical reference signs will be used for the same technical features, even of different embodiments.

FIG. 1 schematically shows a system according to the invention having a vehicle according to the invention 2 and a remote control device 10 according to the invention. The distance between the vehicle 2 and the remote control device 10 is shown here as the actual distance 20. In this case, the actual distance 20 can be substantially the shortest distance between the vehicle 2 and the remote control device 10 e.g. via the direct air path. Digitally stored map material that is saved, e.g. on the computer-readable storage medium according to the invention or a digital database with corresponding coordinates can be used to calculate the actual distance 20. A database such as this includes e.g. a navigation system of the vehicle 2, the functions of which can be used to calculate the actual distance 20. It is likewise possible that other services and/or technologies, such as satellite, radio, GSM and mobile radio and/or digital geographic information services, could be used to determine the positions. Aside from determining the position of the vehicle 2 using e.g. a GPS system 6 and/or a communication device 2.1 of the vehicle 2, it is also necessary to know the position of the remote control device 10 in order to identify the actual distance 20. For this reason, the position of the remote control device 10 is transmitted by the remote control device 10 to the vehicle 2 e.g. by means of the GPS system 6 and/or by mobile radio tracking and e.g. a mobile radio network 4. To illustrate this, a radio antenna 4.1 of the mobile radio network 4 is shown in FIG. 1, wherein further exchange stations are also used to transmit data between the remote control device 10 and the vehicle 2. To send and receive signals and/or data via the mobile radio network 4, the vehicle 2 has the communication device 2.1. Moreover, FIG. 1 shows a specified distance 21 that is smaller than the actual distance 20 in the example illustrated. When an operator with the remote control device 10 approaches the vehicle 2, the difference between the specified distance 21 and the actual distance 20 becomes smaller, wherein a first function of the vehicle 2 is activated if the actual distance 20 is less than or equal to the specified distance 21. Thus the locking mechanism of the vehicle 2 can be unlocked or another function of a security device 1 can be carried out when the operator approaches.

This principle is illustrated in more detail in FIG. 2a. The remote control device 10 is shown here schematically (in a top view) as a circle spaced apart from the vehicle 2 at a distance that is represented by the actual distance 20. The drawings in the figures are not true to scale but instead serve only to illustrate the principle. The specified distance 21 can extend from the vehicle 2 in all directions and thereby form a radius of distance. The remote control device 10 is located outside this radius of the specified distance 21 in FIG. 2a and within it in FIG. 2b. Upon entering the radius, i.e. if the actual distance 20 is less than or equal to the specified distance 21, a first function of the vehicle is activated. This is the case in FIG. 2b, for instance. The activation of functions in stages is likewise possible, as is shown in FIG. 2c. In this case a first specified distance 21a and a second specified distance 21b are defined. Further specified distances 21 that are associated with further functions of the vehicle 2 can also be established. In FIG. 2c, the remote control device 10 is located within the radius of the second specified distance 21b, but not within the radius of the first specified distance 21a. Therefore, only a second function of the vehicle 2, which is associated with the second specified distance 21b, is activated in FIG. 2c. That can be the activation of a light in the vehicle 2, for instance, wherein the locking mechanism of the vehicle 2 is unlocked to allow access to the vehicle 2 only once the remote control device 10 enters the radius of the first specified distance 21a and the actual distance 20 is thus less than or equal to the first specified distance 21a. As is illustrated by an arrow B, however, the remote control device 10 (or the operator with the remote control device 10) moves in the direction of arrow B and thus moves away from the vehicle 2. Thus it can be possible for an evaluation system 2.2 of the vehicle 2 and/or an evaluating unit 10.1 of the remote control device 10, for example, to predict that the remote control device 10 is also moving out of the radius of the second specified distance 21b. The remote control device 10 can transmit appropriate information or commands to the vehicle 2, as well. If the actual distance 20 is greater than the second specified distance 21b, for example, then a further function can be activated or the second function associated with the second specified distance 21b can be deactivated. This can be the deactivation of a light of the vehicle 2, for example.

The position of both the remote control device 10 and the vehicle 2 can be determined by a GPS system 6 and/or by mobile radio tracking. Mobile radio tracking is schematically represented in FIG. 3. In mobile radio tracking, which can be e.g. a GSM tracking, the position of the vehicle 2 and/or the remote control device 10 can be identified based on their connections to the mobile radio network 4. The mobile radio tracking can be used independently of the GPS system 6 and/or to improve the precision of the position data of the GPS system 6. The positions of the schematically represented radio cells 4.2, in which the remote control device 10 and the vehicle 2 are located, are used for positioning. The signal propagation time between the mobile radio device (e.g. the remote control device 10 and/or the vehicle 2 or the communication device 2.1) and a base station of the mobile radio network 4 is evaluated to provide a more accurate determination of the position. To further improve position determination, it is possible, for example, that differences in signal propagation time are measured between the mobile radio device and at least two base stations. As is shown in FIG. 3, further parameters, such as the direction of movement B, can likewise be used. In this way, it can be predicted e.g. that the remote control device 10 is moving toward the vehicle 2 and thus e.g. a time interval used for determining the position should be reduced.

FIG. 4 schematically shows an arrangement of components of a remote control device 10 according to the invention and a vehicle according to the invention 2. Here the remote control device 10 comprises an evaluating unit 10.1, a memory unit 10.2 and a display unit 10.3, which can be interconnected e.g. electronically. It can likewise be possible that the remote control device 10 has a first radio unit 12 and a second radio unit 13, which are also electronically connected e.g. to the evaluating unit 10.1. The first radio unit 12 serves to connect to a mobile radio network 4, by which a data connection to the vehicle 2 can be established. To operate the connection to the mobile radio network 4, the vehicle 2 can itself have a communication device 2.1, by means of which the data sent by the remote control device 10 can be received and data can be transmitted to the remote control device 10. For instance, data for position determination and/or the position of the vehicle 2 or the remote control device 10 can be transmitted via this connection. The second radio unit 13 of the remote control device 10 can be suitable in this instance to receive position data from a GPS system 6 and, if necessary, to determine the position, e.g. using the evaluating unit 10.1. The evaluated position data can be stored in particular in a non-volatile memory unit 10.2 and/or displayed to the operator on a display unit 10.3. The data for transmission to the first radio unit 12 are conveyed—as the evaluated, determined position of the remote control device 10 and/or unmodified as position data from the GPS system 6—and are then sent via the mobile radio network 4 and received by the communication device 2.1. Finally, the position data, e.g. for determining the actual distance 20, are evaluated by the evaluation system 2.2 of the vehicle 2. The evaluation system 2.2 can be a vehicle electronics system 2.2, for example. Additionally, the evaluation system 2.2 can be linked electronically to a non-volatile memory device 2.3 of the vehicle 2, wherein said memory device 2.3 can also contain geographic coordinates. If the evaluation system 2.2 detects that the actual distance 20 is less than or equal to a specified distance 21, then e.g. a first function of a security system 1 of the vehicle 2 can be activated. The evaluation system 2.2 has an electronic connection to the security device 1 for sending a corresponding activation signal. Furthermore, in order to determine the actual distance 20, the vehicle 2 must also determine its own position, wherein the evaluation system 2.2 can be linked electronically to an on-board radio unit 2.4 for this purpose. The on-board radio unit 2.4 can have the same features as those described in connection with the second radio unit 13 and thus permit in particular the receipt of position data from the GPS system 6.

FIG. 5 shows a further embodiment of a device 10. The position is determined here not by a GPS system 6 but rather by mobile radio tracking, i.e. by an evaluation of the received data and/or signals from a mobile radio network 4. Moreover, a second radio unit 13 of the remote control device 10 and an on-board radio unit 2.4 are shown, which are suitable for establishing a Bluetooth connection 8. The Bluetooth connection 8 can be utilized to transmit authorization data, for example, if the remote control device 10 is in close proximity to the vehicle 2. It is also possible to determine positions by evaluating the signal strength, optionally via the second radio unit 13 and/or the on-board radio unit 2.4. Preferably, the Bluetooth connection 8 is activated if the actual distance 20 is less than or equal to the specified distance 21. Only a mobile radio connection 4 is used to determine a position and transmit the position, wherein data and/or signals are transmitted to a radio antenna 4.1 and are received and/or further transmitted by at least one connecting station (such as an interface or gateway 4.3). The interfaces 4.3 can establish a connection to an internet 5 or a comparable network. Additionally, an exchange service 5.1 can be provided which receives the data e.g. from the remote control device 10 and further transmits them to the vehicle 2. Since the exchange service 5.1 thus represents a central node for the transmission of the position data or the position of the vehicle 2 and/or the remote control device 10, it is conceivable that the method steps for determining the actual distance 20, for example, can be carried out by the exchange service 5.1.

A method 100 according to the invention is schematically visualized in FIG. 6. A first method step 100.1 is provided, in which the position of the vehicle 2 is determined. In a second method step 100.2, the position of the remote control device 10 is determined. The order of the method steps is not specified in this case. In a third method step 100.3, an actual distance 20 is determined, wherein the position of the vehicle 2 and the position of the remote control device 10 are drawn upon for the determination. Subsequently, in the fourth method step 100.4, the actual distance 20 is compared with at least one defined specified distance 21, wherein a first function of the vehicle 2 is activated if the actual distance 20 is less than or equal to the specified distance 21.

FIG. 7 schematically shows a computer-readable storage medium 210 according to the invention that includes the computer program product 200 according to the invention. The computer-readable storage medium 210 is preferably configured such that it can be read out by an evaluating unit 10.1 and/or an evaluation system 2.2, i.e. a processor, a microprocessor and/or a microcontroller, and so the computer program product 200 according to the invention can be executed by the evaluating unit 10.1 and/or the evaluation system 2.2 and thus the method according to the invention can be carried out.

The above explanation of the embodiments describes the present invention exclusively within the scope of examples. Of course, individual features of the embodiments can be freely combined with one another, as long as it makes technical sense to do so, without exceeding the scope of the present invention.

LIST OF REFERENCE SIGNS

1 Security device
2 Vehicle 2.1 Communication device
2.2 Evaluation system, vehicle electronics system
2.3 (Non-volatile) memory device
2.4 On-board radio unit
4 Mobile radio network
4.1 Radio antenna
4.2 Radio cell
4.3 Interface, gateway
5 Internet
5.1 Exchange service
6 GPS system
8 Bluetooth connection
10 Remote control device
10.1 Evaluating unit
10.2 Memory unit
10.3 Display unit
12 First radio unit
13 Second radio unit
20 Actual distance
21 Specified distance
21a First specified distance
21b Second specified distance
100 Method
100.1 First method step: Determining the position of the vehicle
100.2 Second method step: Determining the position of the remote control device
100.3 Third method step: Determining an actual distance
100.4 Fourth method step: Comparing the actual distance with a specified distance
200 Computer program product
210 Computer-readable storage medium
B Direction of movement

The invention claimed is:

1. A method for remotely controlling at least a first function of a security device of a vehicle, wherein a remote control device has a first radio unit, by means of which a connection with a mobile radio network can be operated, the method comprising:
   a) determining, by a positioning system of the vehicle, a current position of the vehicle;
   b) determining, by at least one of: (i) a positioning system of the remote control device or (ii) the vehicle, a current position of the remote control device;
   c) receiving, by an evaluation system, the current position of the vehicle and the current position of the remote control device;
   d) determining, by the evaluation system, an actual distance between the current positions of the vehicle and the remote control device;
   e) comparing, by the evaluation system, the actual distance with at least one defined specified distance; and
   f) in response to receiving a determination that the actual distance is less than or equal to the specified distance, activating, by the security device of the vehicle, the at least the first function, wherein activating the first function comprises actuating a contactless authentication of the remote control device by the security device of the vehicle without a dedicated transponder;
   wherein steps a) and b) and c) and d) and e) are carried out cyclically.

2. The method according to claim 1, wherein, during the contactless authentication of the remote control device, a security code is exchanged between the remote control device and the security device of the vehicle.

3. The method according to claim 1, further comprising:
   in response to a successful authentication, granting, by the security device, access to the vehicle.

4. The method according to claim 1, further comprising:
   comparing, by the evaluation system, the actual distance to a second defined specified distance, wherein at least one second function of the security device is activated if the actual distance is less than or equal to the second specified distance; and
   in response to receiving a determination that the actual distance is less than or equal to the specified distance, activating, by the security device of the vehicle, the at least one second function, wherein activating the at least one second function comprises actuating, by the security device of the vehicle at least one of an initiation of the electronics system of the vehicle, actuating an unlocking of the vehicle doors, or starting the vehicle.

5. The method according to claim 1, wherein step a) is carried out with every standstill of the vehicle.

6. The method according to claim 1, wherein position data corresponding to at least one of the current position of the remote control device and the current position of the vehicle is received contactlessly.

7. The method according to claim 1, wherein the mobile radio network is configured according to a GSM, GPRS, UMTS and/or LTE standard.

8. The method according to claim 1, wherein the vehicle has a communication device, by means of which a data connection with the remote control device can be operated.

9. The method according to claim 1, wherein a communication device of the vehicle is configured to operate a data connection with the remote control device, the method further comprising:
   transmitting an emergency signal via said communication device if the vehicle is involved in an accident.

10. The method of claim 1, wherein the evaluation system comprises at least one of:
    an evaluation system of the vehicle;
    an evaluation unit of the remote control device; and
    a separate computing device.

11. The method of claim 4, further comprising:
    after the second function has been activated, comparing, by the evaluation system, the actual distance to the second defined specified distance; and
    in response to receiving a determination that the actual distance is greater than the specified distance, deactivating the at least one second function.

12. A remote control device for remotely controlling at least a first function of a security device of a vehicle, comprising:
    a first radio unit, by which a connection with a mobile radio network can be operated;
    a positioning system configured to determine the current position of the remote control device;
    a processor programmed to:
      receive, via the first radio unit and from the vehicle, the current position of the vehicle;
      determine an actual distance between the current positions of the vehicle and the remote control device;
      compare the actual distance with at least one defined specified distance, wherein the at least the first function is activated if the actual distance is less than or equal to the specified distance; and
      in response to determining that the actual distance is less than or equal to the specified distance, cause the security device of the vehicle to activate the first function, wherein causing the security device of the vehicle to activate the first function comprises causing the security device of the vehicle to actuate a contactless authentication of the remote control device by the security device of the vehicle without a dedicated transponder;

wherein the positioning system is configured to determine the current position of the vehicle cyclically and the processor is programmed to carry out the receive, determine and compare program steps cyclically.

13. The remote control device according to claim 12, wherein the position of the remote control device can be transmitted to the vehicle by the first radio unit.

14. The remote control device according to claim 12, wherein a display unit is arranged at the remote control device, wherein the current position of the vehicle can be displayed on the display unit so as to locate the vehicle for an operator.

15. A system for remotely controlling at least a first function of a security device of a vehicle, the system comprising:
- a vehicle comprising:
  - a positioning system configured to determine the current position of the vehicle;
  - a vehicle radio unit;
  - a vehicle processor programmed to:
    - receive, via the vehicle radio unit and from a remote control device, the current position of the remote control device;
    - determine an actual distance between the current positions of the vehicle and the remote control device;
    - compare the actual distance with at least one defined specified distance, wherein the at least the first function is activated if the actual distance is less than or equal to the specified distance; and
  - the security device programmed to:
    - in response to the determination that the actual distance is less than or equal to the specified distance, activate the at least the first function of the security device, wherein activating the first function comprises actuating a contactless authentication of the remote control device by the security device of the vehicle without a dedicated transponder;

wherein the positioning system is configured to determine the current position of the vehicle cyclically and the vehicle processor is programmed to carry out the receive, determine and compare program steps cyclically.

16. At least one non-transitory computer-readable storage medium storing instructions that, when executed by a processor, cause the processor to perform a method, the method comprising:
- a) determining a current position of a vehicle based on a signal from a communication device of the vehicle;
- b) determining a current position of a remote control device based on a signal from the remote control device;
- c) determining an actual distance between the positions of the vehicle and the remote control device;
- d) comparing the actual distance with at least one defined specified distance, wherein a first function of a security device of the vehicle is activated if the actual distance is less than or equal to the at least one specified distance; and
- e) in response to determining that the actual distance is less than or equal to the at least one specified distance, activating the first function of the security device of the vehicle, wherein activating the first function comprises actuating a contactless authentication of the remote control device by the security device of the vehicle without a dedicated transponder;

wherein steps a) and b) and c) and d) are carried out cyclically.

* * * * *